No. 810,179. PATENTED JAN. 16, 1906.
E. WILSON.
APPARATUS FOR MEASURING WATTS IN ELECTRICAL CIRCUITS.
APPLICATION FILED DEC. 17, 1904.
8 SHEETS—SHEET 1.
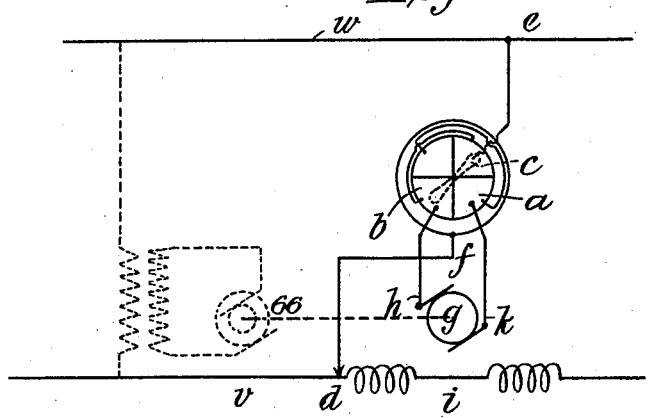
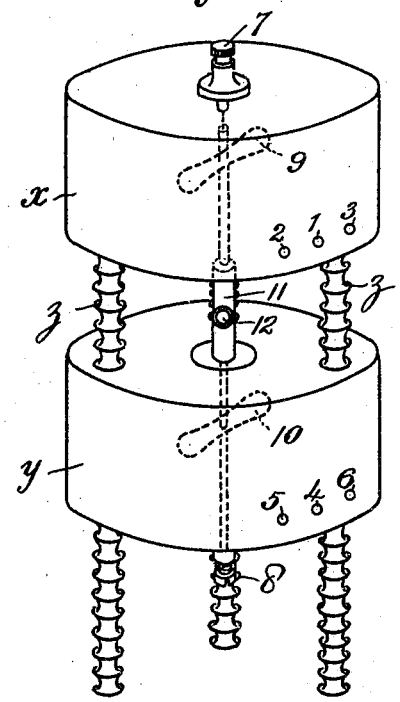

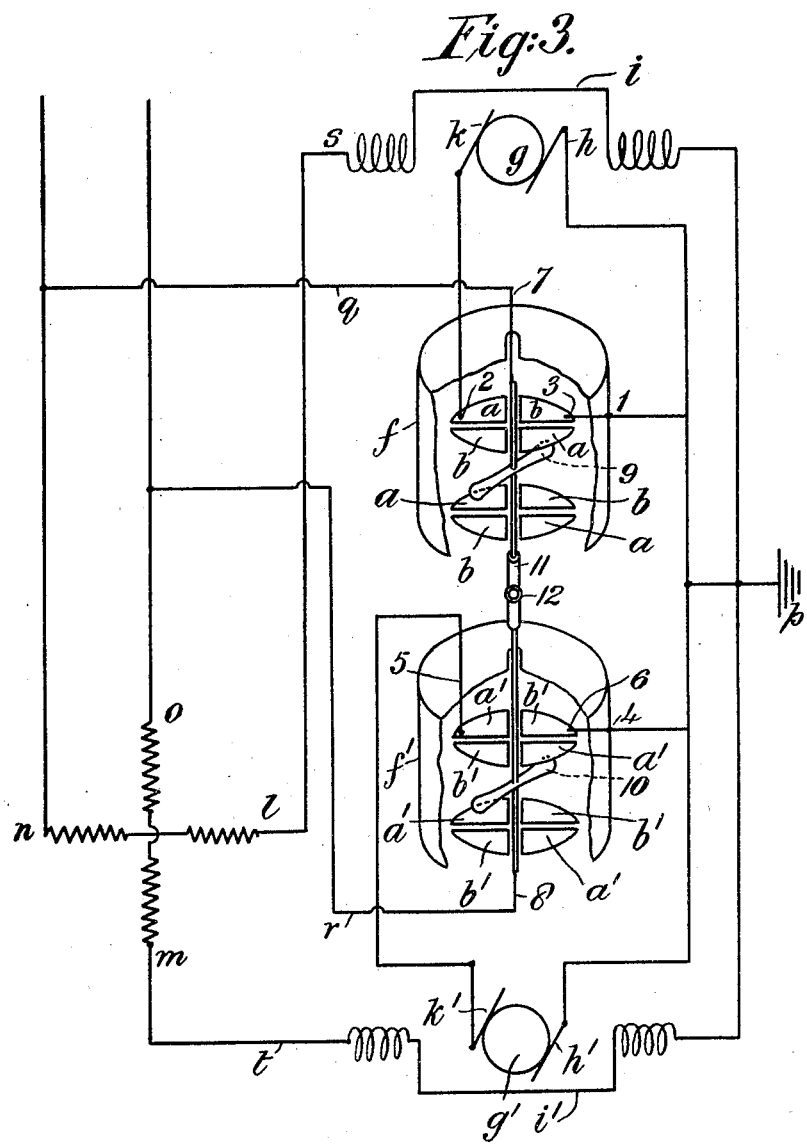

No. 810,179. PATENTED JAN. 16, 1906.
E. WILSON.
APPARATUS FOR MEASURING WATTS IN ELECTRICAL CIRCUITS.
APPLICATION FILED DEC. 17, 1904

Witnesses
Edwin D. Bartlett.
Harold D. Shephard.

Inventor.
Ernest Wilson
per Herbert Sefton Jones
Attorney.

No. 810,179. PATENTED JAN. 16, 1906.
E. WILSON.
APPARATUS FOR MEASURING WATTS IN ELECTRICAL CIRCUITS.
APPLICATION FILED DEC. 17, 1904.

Witnesses
Edwin D. Bartlett.
Harold W. Shepard.

Inventor
Ernest Wilson
per Hubert Sefton Jones
Attorney.

No. 810,179. PATENTED JAN. 16, 1906.
E. WILSON.
APPARATUS FOR MEASURING WATTS IN ELECTRICAL CIRCUITS.
APPLICATION FILED DEC. 17, 1904
8 SHEETS—SHEET 6.
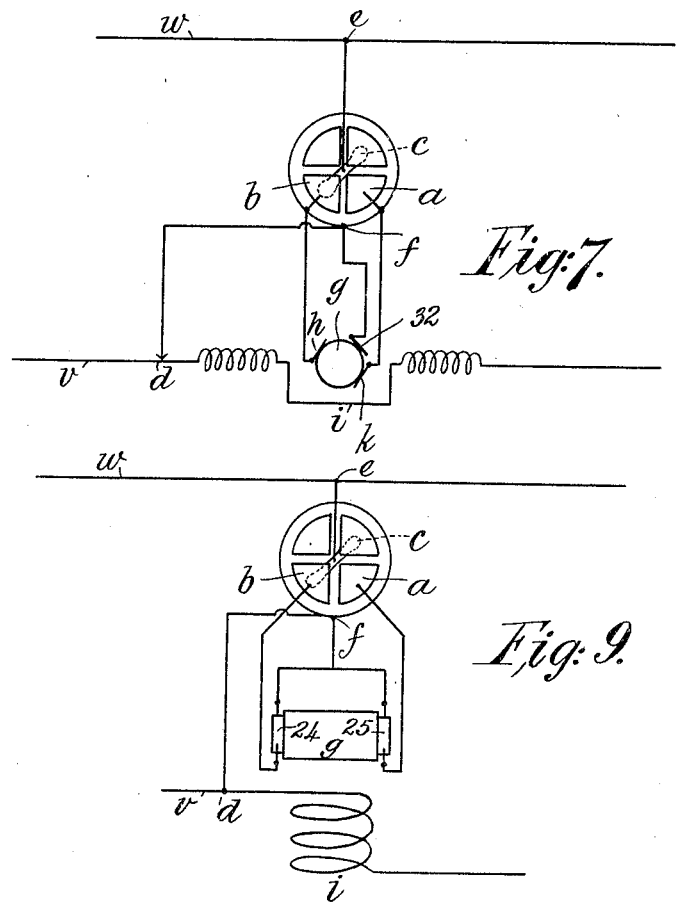
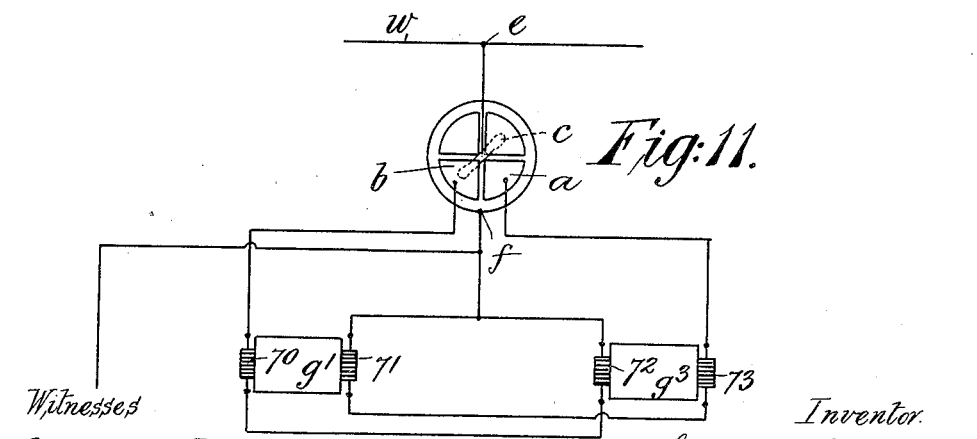
Witnesses
Edwin D. Bartlett
Harold W. Shephard
Inventor
Ernest Wilson
per Hubert Sefton Jones
Attorney No. 810,179. PATENTED JAN. 16, 1906.
E. WILSON.
APPARATUS FOR MEASURING WATTS IN ELECTRICAL CIRCUITS.
APPLICATION FILED DEC. 17, 1904.
8 SHEETS—SHEET 7.
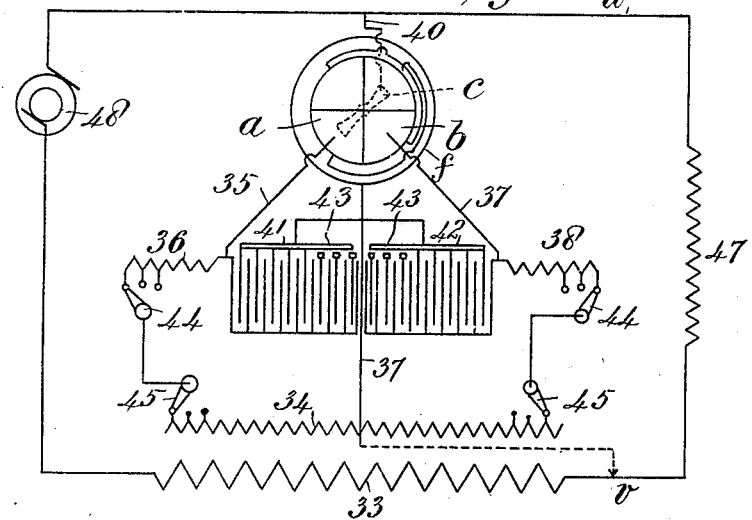
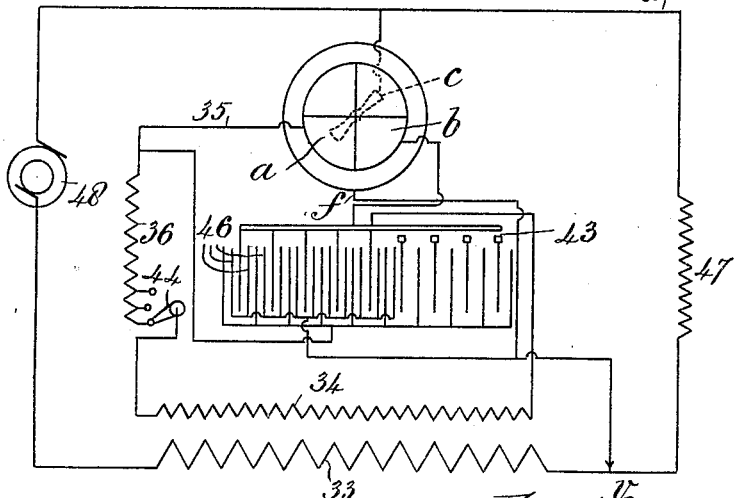

No. 810,179. PATENTED JAN. 16, 1906.
E. WILSON.
APPARATUS FOR MEASURING WATTS IN ELECTRICAL CIRCUITS.
APPLICATION FILED DEC. 17, 1904.
8 SHEETS—SHEET 8.
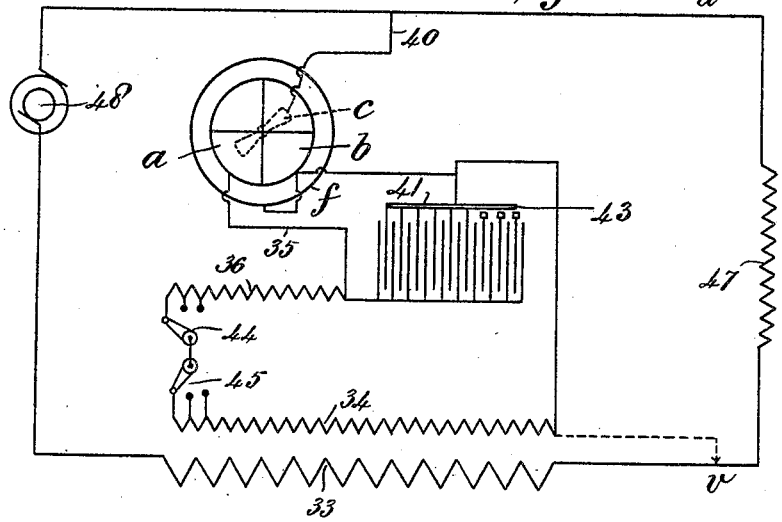
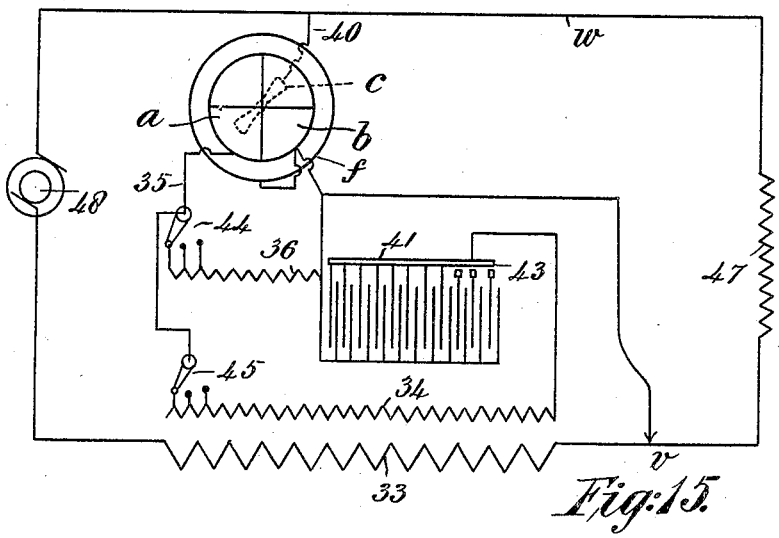
Witnesses
Edwin D Bartlett
Albert Yeates
Inventor
Ernest Wilson.
per Herbert Sefton Jones
Attorney.

UNITED STATES PATENT OFFICE.

ERNEST WILSON, OF LONDON, ENGLAND.

APPARATUS FOR MEASURING WATTS IN ELECTRICAL CIRCUITS.

No. 810,179.  Specification of Letters Patent.  Patented Jan. 16, 1906.

Application filed December 17, 1904. Serial No. 237,275.

*To all whom it may concern:*

Be it known that I, ERNEST WILSON, professor of engineering at King's College, London, W. C., a subject of the King of Great Britain, residing at 64 St. John's Park, Blackheath, in the county of Kent, England, have invented a new and useful Apparatus for Measuring Watts in Electrical Systems, of which the following is a specification.

In connection with the use of the quadrant-electrometer as a wattmeter for alternating or direct current systems it has been usual to employ a non-inductive resistance placed in the work-circuit for the purpose of producing a potential difference to be applied to the quadrants of the electrometer. This method of working involves the dissipation of a certain amount of energy in the resistance placed in the "work-circuit," and when the current is large this dissipation becomes serious and the method has drawbacks.

The present invention has for its object a modification of the system mentioned above, by means of which the use of a special non-inductive resistance in the work-circuit is avoided, the potential for the quadrants of the electrometer being obtained from a secondary system which is so affected by induction from the work-circuit that it will give to the quadrants a potential strictly proportional to and in phase (or opposition of phase) with the current in the work-circuit.

The best method of attaining the desired object is to employ a small dynamo-electric machine driven at constant speed in a field produced by the current in the work-circuit, the armature of the machine then furnishing to the quadrants through a commutator and brushes the necessary potential difference which is proportional to and in phase with the current in the work-circuit. This method is applicable to direct-current systems as well as alternating. In a modification when alternating currents only are dealt with the dynamo-electric machine may be replaced by a coil in which a potential is induced from a primary coil in the work-circuit, the said potential being applied through suitable regulating devices to the terminals of a condenser from which the potential difference for the quadrants is derived. The second arrangement is substantially equivalent to the first, seeing that the induction-coil and regulating devices, which in the second give an induced potential in phase (or opposition of phase) with the current in the work-circuit, have the same effect as the armature which is rotated at constant speed in the form of apparatus first mentioned. In both arrangements the electromotive force in the secondary system varies directly as the current in the primary or work-circuit and is in phase with it.

In the accompanying drawings, Figure 1 illustrates diagrammatically the arrangement for measuring the watts in an electrical system of high-power factor. Fig. 2 shows the form of electrometer preferred for use in measuring the watts in polyphase systems. Fig. 3 shows a diagram of connections for measuring the watts with this electrometer in a two-phase system wherein one end of each phase winding in the generating plant is earthed. Fig. 4 represents in a similar manner the diagram of connections as applied to a three-phase system. Fig. 5 illustrates another method of working applicable to three-phase systems wherein the centers of the phase windings in the generators are connected and may or may not be earthed. Figs. 6, 7, 8, 9, 10, and 11 are detail views hereinafter described, illustrating methods of obtaining from the small dynamo-electric machine a connection for the "case" of the electrometer which shall give to the case a zero potential as compared with the potentials of the quadrants. Figs. 12, 13, 14, and 15 are diagrams of connections hereinafter described, illustrating the method of obtaining the potential difference for the quadrants of the electrometer from a secondary circuit in which an electromotive force is produced by inducton from the work-circuit. This method is only applicable to alternating-current systems.

As is well known, the correctness of the reading with an electrometer used as a wattmeter in ordinary working depends upon the fact that the potentials of the two pairs of quadrants above and below case are equal and opposite, so that the result obtained varies only as the average product of (1) the potential of the needle and (2) the sum of the potentials of the quadrants, or, rather, as the average product of (1) the potential of the needle and (2) the potential of either pair of quadrants, seeing that both pairs are at equal potential above and below case, the potentials being in phase  Now when working with high-power factors and high potential of the needle as compared with the quadrants the error introduced by making the potential of one pair of quadrants zero may be small, because the indication then given varies with the average product of (1) the potential of the needle minus half the potential difference of one of the pairs of quadrants and (2) the potential of the one pair of quadrants, and the potential of the needle being high the subtraction from it in the vector sense of half the potential difference of one of the quadrants makes a difference which may be neglected. Calling the pairs of quadrants in the electrometer $a$ and $b$ and the needle $c$, if the one pair of quadrants—say $b$—is connected to the case, which is taken to be at zero potential the reading given will vary with the average product of (1) the potential of the needle $c$ minus half the difference of potential of the quadrant $a$ and (2) the potential of quadrant $a$. If the voltage of the work-circuit is of the order of, say, ten thousand, (square root of mean square volts,) then the potential of $a$ can be small in comparison with quantity 1; but this arrangement must not be used for very low-power factors, because the average watts with sine curves vary as the cosine of the angle of lag (phase displacement) of the potential difference and the current in the work-circuit, and the effect produced by putting one pair of quadrants to case will be to cause a variation in the angle of lag so far as the instrument is concerned. As the power factor is low, the angle is considerable and its cosine may be greatly affected thereby.

As the device forming the object of this invention is primarily designed for measuring the watts in systems of high-power factors, the arrangements first described will be those wherein the case of the electrometer is connected to one of the pairs of quadrants and to the point in the work-circuit regarded as at zero potential. The modifications necessary for insuring accurate indications on all power factors will be mentioned subsequently.

Referring first to Fig. 1, $v$ and $w$ are two lines or bus-bars in an alternating system between points $d$ and $e$ in which the watts are to be measured. $a$ and $b$ are opposite pairs of quadrants in the electrometer. $c$ is the "needle" of the electrometer connected to the point $e$, and $f$ its case. (Diagonally-opposite quadrants in the electrometer are connected together, as is well known. The connections are not shown on the drawings, because these latter are only intended to illustrate the essence of the present invention.) $i$ is a coil in the work-circuit adapted to supply the magnetic field for the armature $g$ of a small dynamo-electric machine which is driven in the said field at a constant speed by a synchronous motor or by an induction-motor (deriving its current from the work-circuit) or even by a separate direct-current motor, clockwork, or other mechanism of any suitable known type provided with adequate governing means. This motor is indicated diagrammatically in dotted lines at 66 in Fig. 1. For clearness it is not shown separately in the other figures of the drawings; but the letter $g$ (or $g'$ $g^2$) is assumed to cover the motor-generator as a whole. The coil $i$ must be of such construction that it is as nearly as possible devoid of "skin effect" due to induced currents in its mass—that is to say, it may when necessary be a strip or hollow conductor or a conductor composed of stranded wires insulated from one another, in which the exposed surfaces of the several conducting-wires are equal. In the event of a shunt being employed, so that the coil $i$ only carries a portion of the current in the work-circuit, care must be taken to make the ratio of resistance to self-induction the same in the field and shunt coils, respectively. The armature $g$ has a commutator made up of a comparatively large number of parts on which bear brushes $h$ $k$, connected, respectively, to the quadrants $b$ and $a$. It is important to set the brushes $h$ $k$ on the "neutral line" in order that the electromotive force of the armature may be that due only to the cutting of the lines of force by rotation of the armature. If the armature is stationary, an alternating magnetic field produced by the current in the field-coil should produce no electromotive force between the brushes $h$ $k$. By aid of a revolving contact-maker and an electrometer used in well-known manner the brushes may be set so that the electromotive force between them is zero when the current in the work-circuit is zero. Under these conditions the electromotive force of the armature has the same wave form as the current in the work-circuit. Quadrants $b$ are shown connected to the case $f$ and to the one point $d$ in the work-circuit. The generator $g$ contains as little metal as possible besides the armature and field coils, and the coils $i$ are in air or other medium of constant permeability. Practically no current passes through the armature of the generator. It serves only to supply the necessary potential difference to the quadrants. Hence the energy dissipated in the armature-coils will be practically nil. The number of commutator parts should be such that wave forms of the current in the work-circuit can be accurately repeated in the wave forms of the electromotive force of the armature as between its brushes. It has been found that one hundred commutator parts is sufficient in a two-pole generator making one revolution per period to successfully deal with wave forms deviating considerably from a sine curve. The construction of the generator forms no part of this invention. A suitable type of such generator has been explained in detail in the complete specification of British Patent No. 5,582 of 1904; but many other suitable forms of generator might be designed to work according to this invention. The electrometer also may have any suitable internal construction. One suitable form of construction is described in the complete specification of British Patent No. 2,707 of 1904. The electrometer, however, forms no part of this invention in so far as its internal construction is concerned.

The system shown in Fig. 1 is obviously applicable to the measurement of watts in direct-current as well as alternating-current systems. The arrangement for both purposes is the same. For a two or more phase system the watts may be measured by using other complete sets of apparatus, each similar to that shown in Fig. 1, connected between points in the work-circuit conductors or bus-bars of the several phases, or the same set may be connected successively between the several conductors. The readings so obtained must be added together to obtain the total watts. The lines $v$ and $w$, for instance, may be regarded as two bus-bars for one phase in a two-phase system, and the same arrangement would be required between the two bus-bars of the other phase, or $v$ and $w$ may be two of the bus-bars of a three-phase system, and another set of apparatus would then be required in which the needle of the instrument would be also connected at $e$ in bar $w$, and the potential difference for the quadrants would be obtained by another generator $g$, working in a coil $i$, connected to the other phase bus-bar. Such general arrangements will need no further explanation, as they correspond with those now usually employed with wattmeters operating with non-inductive resistances in the work-circuit. It is possible, however, to avoid the inconvenience of having to add together the readings of two or more wattmeters by employing an instrument in which the electrometers separated by adequate insulation are mounted one upon another, so that their needles are on one spindle whose movements are due to the combined forces acting on the needles. The indications then given will be the total watts between the several phases of the system. An instrument of this character suitable for use as a wattmeter for two or three phase systems is illustrated in Fig. 2. The upper and lower parts $x$ $y$ (each a complete electrometer substantially of the type, for instance, explained in the specification of British Patent No. 2,707 of 1904) are separated from one another and from the ground by adequate insulation in the form of pillars $z$. The needles 9 10, one of which is indicated by dotted lines in each instrument, are mounted on spindles rigidly connected at the center by an insulating-piece 11, which may carry the mirror 12 or other means for indicating deflections. The terminals for the needles are at 7 and 8, respectively, while 1 and 4 are the two case-terminals, and 2 3 and 5 6 are the respective terminals of the pairs of quadrants in the instruments insulated from the cases. If under any circumstances the two cases are to be at the same or zero potential, the terminals 1 and 4 may be connected, while if the needles in both instruments are to be at the same potential the terminals 7 and 8 may be connected.

Fig. 3 shows diagrammatically the essential parts of the electrometer above explained as applied by a system for measuring watts in a two-phase plant wherein one end of each phase winding in the generators is earthed or connected to a common point $p$. The electrometer and its terminals are lettered and numbered to correspond with Figs. 1 and 2, the letters in the lower instrument corresponding with those in the upper instrument being "dashed." For the sake of clearness only the top and bottom portions of the quadrants are shown. The ends $l$ $m$ of the two windings in the generator are earthed or connected to a common point at $p$ after being carried by lines $s$ $t$, respectively, through the field-coils $i$ $i'$ of the two generators $g$ $g'$. The other ends $n$ $o$ of the windings going to the bush-bars or mains are connected by lines $q$ $r$, respectively, with the terminals 7 8 of needles 9 10, which are thus respectively at the potentials of the ends $n$ $o$. The brushes $h$ $h'$ are connected to the cases $f$ $f'$ at 1 and 4, and these latter are connected together to the quadrants $b$ $b'$ and to a point $p$, as indicated, which may or may not be earthed. The brushes $k$ $k'$ are connected, respectively, to quadrants $a$ $a'$. With this system the reading of deflection of the connected needles 9 10 will give directly the total watts.

Fig. 4 shows the diagram of connections for using the electrometer with connected needles on a three-phase system. The main 16 from the end 13 of one star (or mesh) in the generator contains the field-coil $i$ of generator $g$. The main 17 from end 14 of another star (or mesh) contains the coil $i'$ of the second generator $g'$. The main 18 from end 15 of the third star (or mesh) is connected to both terminals 7 8 of needles 9 10. The brushes $k$ $k'$ are connected to the quadrants $a$ $a'$, as before, and brushes $h$ $h'$ are connected at 1 4 to the cases $f$ $f'$ (to which also the quadrants $b$ $b'$ are connected) and also to terminals 13 14. The needles are thus at the potential of the terminal 15 and the cases with the quadrants $b$ $b'$ in each at the potentials of terminals 13 14, respectively, while the quadrants $a$ $a'$ differ in potential from quadrants $b$ $b'$ by the potential difference produced by the generators $g$ $g'$, which for a given value of the potential of the needle is sufficient to produce the desired sensibility.

The last-described arrangement is suitable for any three-phase system. In one, in which the centers of the stars in the generators are earthed or connected to a common point at 20 through lines 28, 29, 30, and 19 in Fig. 5, the arrangement shown in that figure is applicable. This arrangement has the advantage that the case of the instrument and one pair of quadrants are earthed, rendering the apparatus easier to handle. Three generators $g$ $g'$ $g^2$ are required, each working in a field provided by the currents in the lines 28, 29, and 30, respectively. The electrometer must now have in one case $f$ (or three connected cases) three sets of quadrants $a$ $b$, $a'$ $b'$, and $a^2$ $b^2$, with three needles 9 21 10 insulated from one another on a rigid spindle. The needles are connected to the three terminals of the generator plant, 9 being connected by its terminal 7 to 15, 10 by its terminal 8 to 13, and 21 (the intermediate needle) to terminal 14 by an insulated conductor 22, connected to the stem of the needle by a flexible end piece 31. The quadrants $b$ $b'$ $b^2$ are connected to the case $f$, and this latter is earthed by lines 23 19. The quadrants $a$ $a'$ $a^2$ are connected to the brushes $k^2$ $k'$ $k$, and brushes $h^2$ $h'$ $h$ are earthed. The reading given by this instrument is the total watts between the three mains or phases.

In all the arrangements above explained one pair of quadrants is connected to case—an expedient only advisable when the power factor of the system is high. An arrangement such as those shown in Figs. 6, 7, 8, 9, 10, or 11 must be adopted when working on very low power factors, where the connection of one pair of quadrants to the case would introduce error.

In the arrangement shown in Fig. 6 the connections are exactly as in Fig. 1, except that the brushes $h$ $k$ are connected to quadrants $b$ $a$, respectively, neither of which is joined to case, and the case $f$ is connected to the middle plate of a condenser $j$, the outer plates of which are charged by brushes $h$ $k$, respectively. The case $f$ (which is also connected to a point $d$ in the main $v$) is thus at an intermediate potential between those of the pairs of quadrants.

Fig. 7 shows an arrangement wherein the intermediate and relative zero potential for the case is obtained from a brush 32 working on the commutator of armature $g$ at the neutral point between brushes $h$ and $k$.

Fig. 9 shows an arrangement wherein the armature $g$ has two complete and equal windings connected, respectively, to the commutators 24 25. One brush on each commutator is then connected to case $f$, while the other brushes go to quadrants $a$ and $b$.

Figure 4:
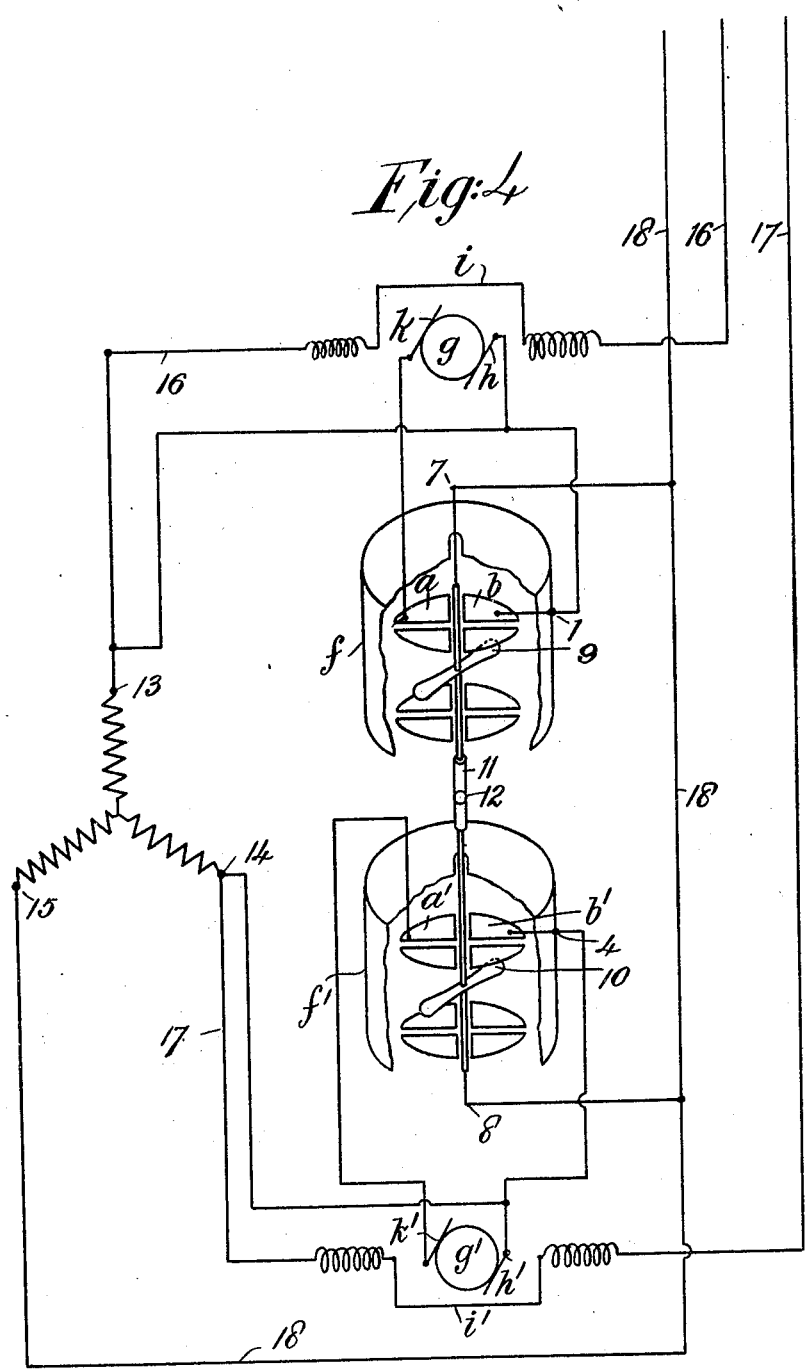
Figure 5:
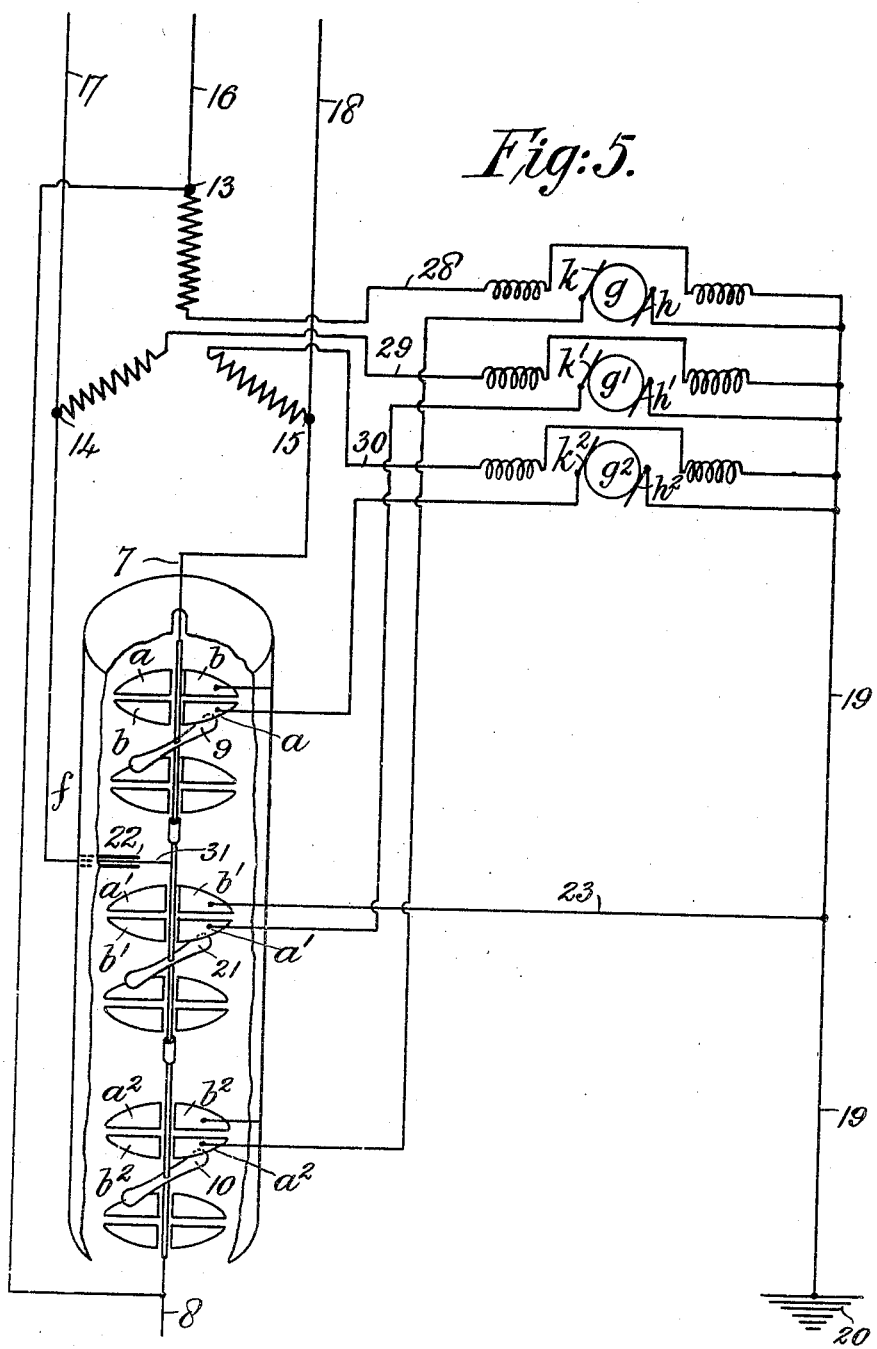
Figure 6:
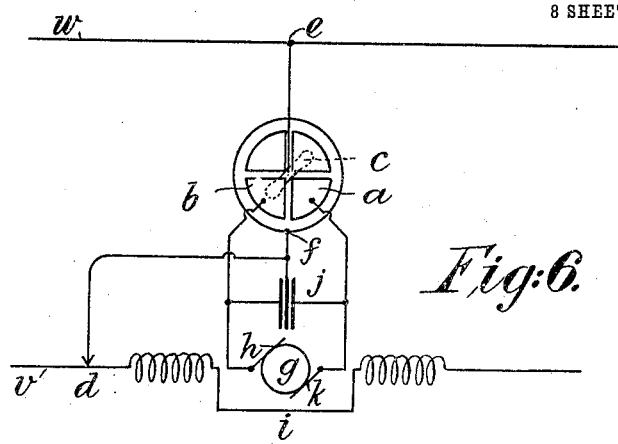
Figure 8:
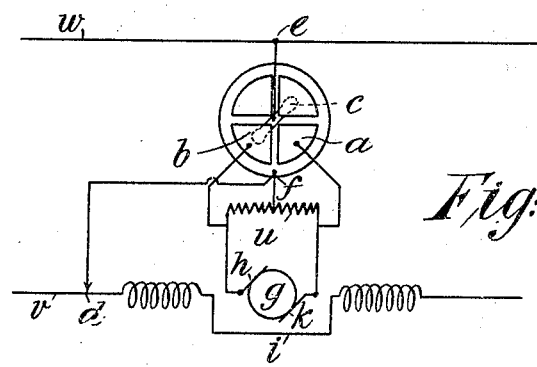
Fig. 8 shows an arrangement in which a high non-inductive resistance $u$ replaces the condenser $j$ of Fig. 6, the case $f$ being connected to the center of the resistance.
Figure 10:
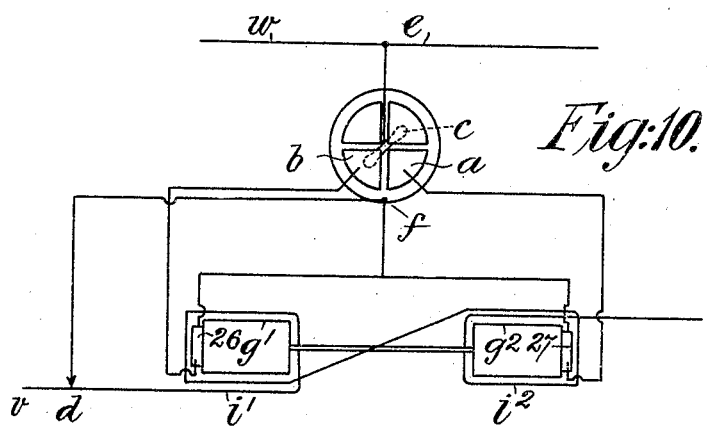
Fig. 10 shows a modification wherein there are two equal armatures $g'$ $g^2$ on one shaft working in opposed fields of equal strength produced by coils $i'$ $i^2$, (wound in opposite senses,) and each armature has a commutator 26 27. The brushes are connected together and to the quadrants just as in Fig. 9.

Fig. 11 shows how the brushes of two double armatures, such as that shown in Fig. 9, but placed one in each of two opposed fields, as in Fig. 10, may be connected to one another and to the quadrants in order that the electromotive forces between the case and one pair of quadrants and the case and the other pair of quadrants, respectively, may be at all times equal and opposite in sign. $g$ $g'$ are the two armatures. 70 71 and 72 73 are their commutators. One brush of commutator 70 is connected to quadrant pair $b$ and the other brush to one brush of commutator 72. Similarly one brush of commutator 73 is connected to quadrant pair $a$ and the other to one brush of commutator 71. The remaining brushes of commutators 71 72 are connected together and to the case $f$. This arrangement has the advantage of astaticism, so that it can be used in places where there are magnetic fields other than the magnetic field produced by currents in the coil $i$ in the work-circuit.

In all the arrangements above explained if the motor 66 is of the synchronous type and works in synchronism with the generators supplying the alternating current should the frequency of the current in the work-circuit vary the machine may still be made to give a potential strictly proportional to the said current if a portion of the latter be taken in a suitably-controlled shunt past the generator-coil $i$, or, when the motor 66 is of the induction type, its speed may be controlled, as is required, by varying the resistance in its armature in any suitable known manner. In every case the speed of the generator must be kept constant, or a correction must be applied to the wattmeter reading if the speed varies by known amount.

Referring now to the modified constructions illustrated in Figs. 12 to 15, the same letters of reference have been employed for the parts which are the same as in Figs. 1 to 11.

In Fig. 12, 48 is the source of alternating current connected by bus-bars or the like $v$ $w$ to the load 47. At any convenient point in the work-circuit is inserted the primary 33 of an induction-coil containing a very few turns and a number of smaller wire turns 34 in the secondary. Preferably an air-coil should be used, as iron or other similar medium in the coil is objectionable because of its variable permeability. The one pair of quadrants $a$ of the electrometer is connected to one end of the induction-coil secondary 34 through a wire 35 and inductive resistance 36, while the other pair $b$ is connected to the other end of winding 34 by wire 37 and inductive resistance 38. The case $f$ of the instrument is connected by a lead 39 to the center of the winding 34 and (as indicated by dotted lines) to a point in the work-circuit, while the needle $c$ is connected by a lead 40 to another point in the work-circuit, it being required to measure the watts between the said two points. The case of the instrument $f$ is also connected to one side of each of two condensers 41 42, which through the lead 39 and resistances 36 38 make up two secondary circuits, each including half of the winding 34. In the diagram plug-contacts 43 are shown for varying the capacities of the condensers 41 42, switches 44 for adjusting the inductive resistances 36 38, and switches 45 for varying the mutual induction between the primary 33 and secondary 34. The said devices of course stand for any known means for varying the capacity, self-induction, and mutual induction. By equally adjusting either the self-induction or the capacity, or both, in each of the two secondary circuits, respectively, for a given frequency it is possible with simple harmonic curves, as will be well understood, to cause the potential difference at the terminals of the condensers to be in quadrature with the electromotive force impressed on the secondary circuit by mutual induction from the work-circuit, and since this impressed electromotive force is in quadrature with the current in the work-circuit the potential differences between the terminals of each condenser may be kept equal and brought into opposition of phase with the current in the work-circuit. Since also the case of the instrument is connected to one terminal of each condenser and the pairs of quadrants, respectively, to the other terminals, the potential differences between the respective pairs of quadrants and the case are equal and opposite in sign and have amplitudes proportional to and are in phase with the current in the work-circuit. By this arrangement, therefore, results are obtained from the electrometer in the same way as by the usual method of measurement, but without the use of the usual non-inductive resistance in the work-circuit. Moreover, since the potential difference between the case and the quadrants may be many fold the potential difference between the ends of the primary coil 33 the dissipation of energy in the coil 33 may be very small as compared with the dissipation of energy which would occur in a non-inductive resistance if the same potential difference between the case and quadrants had to be produced thereby. For a given frequency, then the self-induction and capacity must be adjusted, as is well known, in order to bring about the result explained. The variation of mutual induction between the primary and secondary coils may be convenient when varying power factors have to be dealt with. When the power factor of the work-circuit is high, the mutual induction can be made smaller than when the power-factor is small; but for a given mutual induction and frequency the potential difference between the case and the quadrants can be varied in amplitude by simultaneously varying the capacity and self-induction, as is well known, and in such manner that the potential differences between the case and quadrants, respectively, are still equal and in phase with the current in the work-circuit, so that if it is not desired to vary the mutual induction the adjustment can still be effected by variation of the self-induction and capacity of the secondary circuit 34 in order to suit the sensibility of the instrument. The condensers 41 42 should have a capacity large as compared with the capacity of the electrometer in order that any variations in the latter may not cause the potential difference between the quadrants and the case to vary appreciably other than in direct proportion to the current in the work-circuit, both in amplitude and phase. The dielectric chosen should be such as to dissipate little or no energy when subjected to varying displacement currents, and the insulation resistance between the plates of the condensers should be high. The portion of the work-circuit acting inductively upon the secondary circuit should be of such construction that it is as nearly as possible devoid of "skin effect," due to induced currents in its mass—that is to say, it may when necessary be a strip or hollow conductor, or, preferably, a conductor composed of stranded wires insulated from one another, in which the exposed surfaces of the several conducting-wires are equal. The secondary windings will preferably be as far as possible surrounded by or embedded among the primary windings in the work-circuit, seeing that the medium in which the coils are placed is to be air or a medium of as far as possible constant permeability.

The arrangement shown in Fig. 12 may be modified in such a way as to use one secondary circuit instead of two while securing substantially the same effects. This is done by the arrangement shown diagrammatically in Fig. 13. The work-circuit, means for mutual induction, and the inductive resistance in the secondary circuit are the same as before and are lettered to correspond with the left-hand part of Fig. 12. The condenser 42 and resistance 38 are unnecessary, the lead 37 from quadrant $b$ being taken to the second terminal of the condenser 41, while the case $f$ is connected to a plate or plates 46 midway between the other plates of the condenser and to the main conductor $v$ and is thereby made to have an intermediate (and relative zero) potential. In other respects the operation of this system agrees with that of Fig. 12.

The arrangements of Figs. 12 and 13 are suitable for use on systems of all power factors; but when working upon systems of high-power factor a simplification corresponding to that first described in the specification is available—that is to say, the case of the electrometer may be connected to one of the quadrants. Fig. 14 shows such an arrangement applied to the system of Fig. 12. In this case the second set of apparatus (shown in Fig. 12) for maintaining one quadrant pair $b$ at an equal and opposite potential (to the other pair $a$ relatively to the potential of the needle) is dispensed with, the quadrant $b$ being directly connected to the case $f$, on the one hand, and to the one set of plates of the condenser 41 and the end of coil 34 on the other hand. This figure will require no further explanation.

The necessary potential difference for the quadrants of the electrometer can be obtained by connecting the quadrants and case across the self-inductive portion of the circuit; but as this method is more troublesome than the one above described the first method is preferable. In some cases, however, the modified method may be available, and it is therefore explained. The arrangement as applied to the system of Fig. 14 is shown in Fig. 15, the corresponding parts being similarly lettered. The electrometer is connected across the inductive resistance 36, and this and the condenser 41 are so adjusted that the impedance voltage, which now gives the potential difference to the quadrants, is in quadrature with the electromotive force impressed by the work-circuit upon the inducing part of the secondary circuit and is therefore in phase with the current in the work-circuit. This method, however, involves more difficult adjustments of the reactance, resistance, and capacity in the secondary circuit, as will be well understood by an engineer.

What I claim is—

1. Apparatus for measuring the watts in electrical systems comprising, in combination with the primary conductors, a secondary electric system, means for producing between two points in the secondary system a potential which varies with the current in the work-circuit and is always proportional thereto, an electrometer, means connecting the pairs of quadrants of said electrometer to the said two points in the secondary system, and means connecting the case and the needle of the electrometer to the points between which the watts are to be measured.

2. Apparatus for measuring the watts in electrical systems comprising, in combination with the primary conductors, a secondary electric system, means for producing between two points in the secondary system a potential which varies directly with the current in the work-circuit, an electrometer, means connecting the pairs of quadrants of said electrometer to said two points in the secondary system, means connecting the case and the needle of the electrometer to the points between which the watts are to be measured, and means connecting one of the pairs of quadrants to the case.

3. Apparatus for measuring the watts in electrical systems comprising, in combination with a plurality of primary conductors, a plurality of secondary electrical systems, means for producing between two points in each such a system a potential which varies directly with the current in one of the primary conductors, a plurality of electrometers, means connecting the pairs of quadrants in each electrometer to the two points in one of the secondary systems, and means connecting the cases and needles of the electrometers to the points between which the watts are to be measured.

4. Apparatus for measuring the watts in electrical systems comprising, in combination with a plurality of primary conductors, a plurality of secondary electric systems, means for producing between two points in each such system a potential which varies directly with the current in one of the primary conductors, a plurality of electrometers and insulating means connecting the spindles of their needles together, means connecting the pairs of quadrants in each electrometer to the two points in one of the secondary systems, and means connecting the cases and needles of the electrometers to the points between which the watts are to be measured.

5. Apparatus for measuring the watts in electrical systems comprising, in combination with a plurality of primary conductors, a plurality of secondary electric systems, means for producing between two points in each such system a potential which varies directly with the current in one of the primary conductors, a plurality of electrometers, means connecting the pairs of quadrants in each of said electrometers to the two points in one of the secondary systems, means connecting the cases and needles of the electrometers to the points between which the watts are to be measured, and means connecting one pair of quadrants in each electrometer to the case.

6. Apparatus for measuring the watts in electrical systems comprising, in combination with the primary conductors, a dynamo-electric machine the field of which is produced by the current in the work-circuit, means for driving the armature of said machine at constant speed, a secondary electric system connected to the brushes of the machine, an electrometer, the pairs of quadrants of which are in the secondary system, and means connecting the case and needle of the electrometer to the points between which the watts are to be measured.

7. Apparatus for measuring the watts in electrical systems comprising, in combination with a plurality of primary conductors, a plurality of dynamo-electric machines through the field-coils of each of which the primary current of one of said conductors is taken, means for driving the armature of each machine at constant speed, a plurality of secondary electric systems each connected to the brushes of one of the machines, a plurality of electrometers the pairs of quadrants of which are in the respective secondary systems, and means connecting the cases and needles of said electrometers to the points between which the watts are to be measured.

8. Apparatus for measuring the watts in electrical systems comprising, in combination with a plurality of primary conductors, a plurality of dynamo-electric machines through the field-coils of each of which the primary current of one of said conductors is taken, means for driving the armature of each machine at constant speed, a plurality of secondary electric systems each connected to the brushes of one of the machines, a plurality of electrometers and insulating means connecting their spindles, the pairs of quadrants in each electrometer being connected in one of the secondary systems, and means connecting the cases and needles of the electrometers to the points between which the watts are to be measured.

9. Apparatus for measuring the watts in alternating-current systems comprising, in combination with two primary conductors carrying working currents of different phases and two other primary conductors each earthed at one point and connected to one end of a phase-winding in the generating-station, two dynamo-electric machines the field-coil of each of which is connected in one of the earthed primary conductors, means for driving the armatures of said machines at constant speed, two electrometers and insulating means connecting the spindles of their needles, means connecting the pairs of quadrants in each electrometer each to one of the brushes of the dynamo-electric machines, and connections between the cases of the electrometers and earth, and between the needles of the electrometers and the respective primary conductors carrying the working currents.

10. Apparatus for measuring the watts in alternating-current systems comprising, in combination with two primary conductors carrying working currents of different phases and two other primary conductors each earthed at one point and connected to one end of a phase-winding in the generating-station, two dynamo-electric machines the field-coil of each of which is connected in one of the earthed primary conductors, means for driving the armatures of said machines at constant speed, two electrometers and insulating means connecting the spindles of their needles, means connecting the pairs of quadrants in each electrometer each to one of the brushes of the dynamo-electric machines, and connections between the cases of the electrometers and earth between the cases and one pair of quadrants in each, and between the needles of the electrometers and the respective primary conductors carrying the working currents.

In testimony whereof I have signed my name to this specification in the presence of two subscribing witnesses.

ERNEST WILSON.

Witnesses:
HUBERT A. GILL,
LEONARD E. HAYNES.